Figure 1:
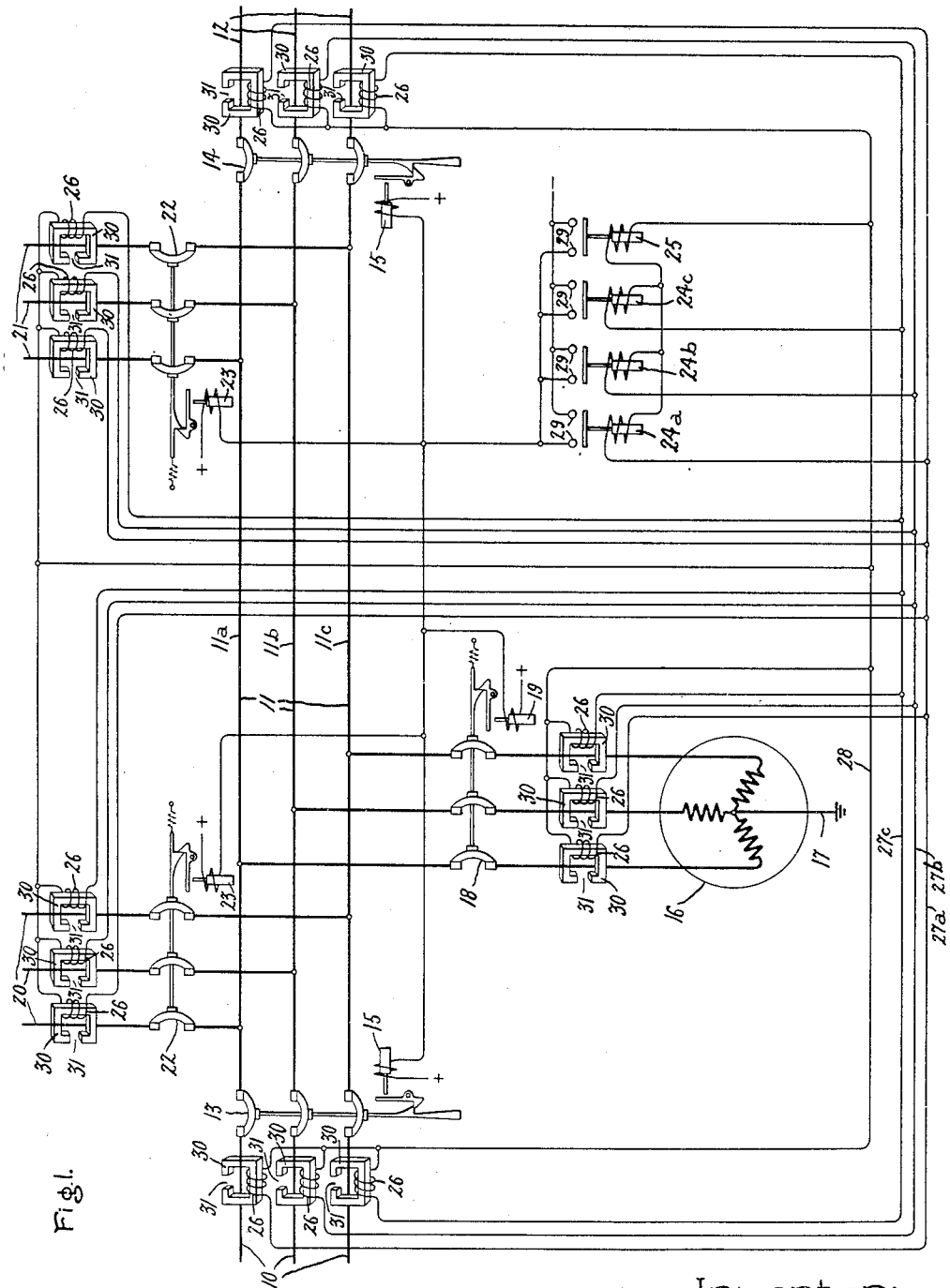

Feb. 15, 1944.   A. T. SINKS   2,341,954
CURRENT TRANSFORMER
Original Filed June 6, 1940    2 Sheets-Sheet 1

Inventor:
Allen T. Sinks,
by Harry E. Dunham
His Attorney

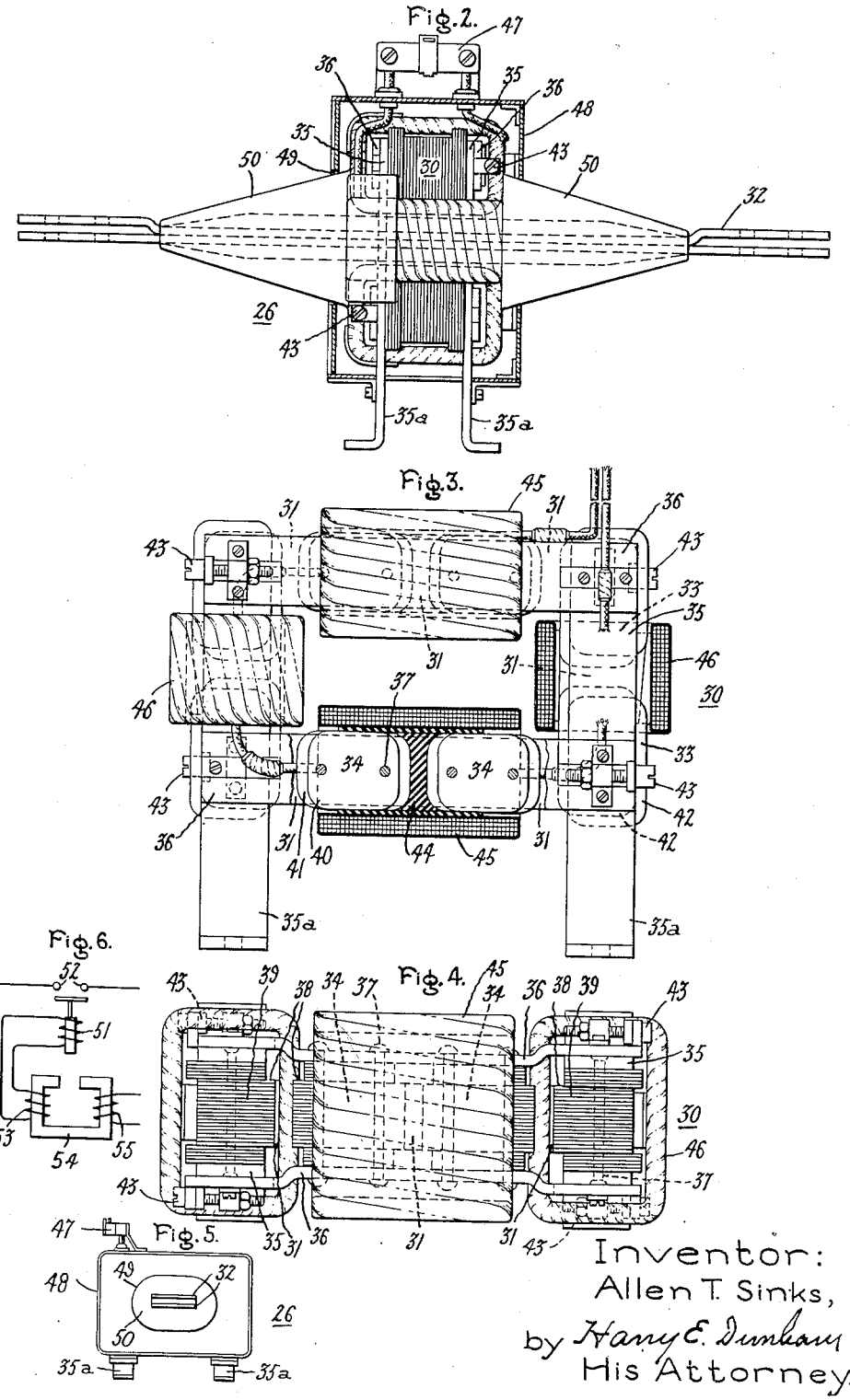

Patented Feb. 15, 1944

2,341,954

UNITED STATES PATENT OFFICE 2,341,954

CURRENT TRANSFORMER

Allen T. Sinks, Beach Bluff, Mass., assignor to General Electric Company, a corporation of New York Original application June 6, 1940, Serial No. 339,121. Divided and this application March 4, 1941, Serial No. 381,689

6 Claims. (Cl. 175—358)

My invention relates to transformers and to current transformers for use in connection with differential protective systems for alternating-current power systems.

This application is a division of my application, Serial No. 339,121, filed June 6, 1940, entitled "Electric protective arrangement," and assigned to the same assignee as the present application.

Differential protective arrangements usually include current transformers for deriving, for the control of the protective apparatus, currents which are respectively proportional to the magnitudes of the currents at different points on the system or portion thereof being protected. For this purpose, it has been the practice in protective arrangements for alternating-current power systems to use current transformers having closed magnetic cores. However, the use of such closed magnetic-core current transformers in protective arrangements for power systems, which embody highly inductive rotating apparatus and which are subject to sudden changes of current under certain conditions, such as fault conditions, for example, has resulted in false operation of the relays, particularly relays of the type in which there is produced a torque dependent solely upon the magnitude of the current in a single winding of the relay, of the protective arrangement because of the saturation of the cores of the current transformers by the direct-current transient component which is superimposed on the symmetrical alternating-current component of current.

Designers of alternating-current protective arrangements have been confronted with this problem for many years and various arrangements have been suggested to prevent such false operation of the protective relays due to the saturation of the associated current transformers by such direct current transient component of the current, but all of these proposed arrangements have certain disadvantages which have prevented them from becoming an entirely satisfactory practical solution of the problem.

One suggested arrangement for overcoming this difficulty was to use current transformers having closed magnetic cores of sufficient size to prevent them from becoming saturated under all current conditions that can occur in the power circuit or the portion thereof being protected. The size and cost of such transformers for use in power circuits carrying large currents are such, however, that it is impractical to use them.

Another suggested arrangement was to use current transformers having nonmagnetic cores. Such current transformers, however, have such a small secondary output that it is necessary to provide, in addition, suitable current amplifying means so that enough current can be obtained to operate the protective relays. Such additional means not only increases the cost of the apparatus but results in a very complicated arrangement, particularly when there are a large number of parallel connected current transformers involved, as is the case in bus protective arrangements.

A third arrangement, which has been suggested for certain types of alternating-current protective systems, consists of a shunt circuit around the current winding of each protective relay. This shunt circuit is designed so that the direct-current component of the current induced in the current transformer secondary winding flows through the shunt circuit instead of through the relay winding in order that only the alternating-current component of the current can flow through the relay winding. Since this also requires additional apparatus for each transformer, it results in an expensive and complicated arrangement.

Also, in order to avoid false operation due to the saturation effect produced by the direct-current transient component, it has sometimes been necessary to raise the settings of the protective relays, which seriously impairs the proper functioning of the protective arrangement under certain fault conditions.

It is an object of my invention, therefore, to provide a new and improved current transformer for use in connection with an alternating-current protective system.

A further object of my invention is to provide an improved alternating-current protective system embodying current transformers whereby false operation of the protective relays due to the direct-current transient component of the current is prevented without the necessity of providing additional auxiliary apparatus such as current-amplifying means or auxiliary shunt circuits around the current coils of the protective relays and without impairing the proper functioning of the relays in response to all fault currents.

In acordance with my invention, I accomplish the desired result of preventing the current in the power circuit being protected from causing a false operation of the protective relays by employing current transformers having magnetic cores which have one or more air gaps therein so that the cores do not become saturated under any current condition occurring in the circuit or portion thereof being protected. With such an arrangement, not only is there a linear relationship maintained between the primary and secondary currents of each transformer under all current conditions occurring in the power circuit being protected but also, by properly designing the core, sufficient secondary current for operating the protective relays can be obtained directly from the current transformer under all fault conditions requiring such operation.

For a better understanding of my invention, reference may be had to the accompanying drawings in which Fig. 1 is a schematic diagram of a differential protective system embodying my invention, Fig. 2 is a front view partly in section of a current transformer which may be used in connection with the protective system of Fig. 1, Fig. 3 is a side view partly in section of the core and windings of the current transformer of Fig. 2, Fig. 4 is a top view of Fig. 3, Fig. 5 is a side view of Fig. 2, and Fig. 6 is a schematic diagram of a portion of a protective system also embodying my invention.

It will be understood by those skilled in the art that my invention is applicable to many different protective arrangements and, by way of example, I have chosen to illustrate my invention in Fig. 1 as applied to a differential protective system for a polyphase alternating-current sectionalized bus system of which three sections 10, 11, and 12 are schematically shown. Only one section 11 is shown completely since the others are substantially duplicates as far as my invention is concerned and this section 11 is illustrated as a three-phase bus including phase conductors 11a, 11b, and 11c. The bus sections 10, 11, and 12 are shown as interconnected by suitable switching means, such as latched closed circuit breakers 13 and 14, each provided with trip coils 15.

Each bus section, such as 11, for example, may have one or more sources of supply, which I have indicated as a Y-connected generator 16 provided with a grounded neutral connection 17. In order to disconnect source 16 from bus section 11 in case of a fault, a suitable switching means, such as circuit breaker 18, is provided having a trip coil 19.

A plurality of feeders, such as 20 and 21, are connected to bus section 11 through suitable switching means, such as latched closed circuit breakers 22, which are provided with trip coils 23.

In order to isolate a faulty bus section, I provide means for effecting the opening of the bus bar circuit breakers 13 and 14, the source circuit breaker 18, and all the feeder circuit breakers 22 upon the occurrence of a fault on the protected section 11. As shown, this means comprises phase-fault differential relays 24a, 24b, and 24c and a ground-fault differential relay 25. The particular construction of these relays forms no part of the present invention and, hence, they are only schematically shown. These relays are arranged to be energized by a current dependent on the vector sum of all the currents flowing into and out of the bus section 11 being protected. This differential relay current is obtained from current transformers 26 located at the ends of the bus sections, in the generator circuit, and in the feeder circuits 20 and 21 connected to bus section 11. In view of the three-phase system, the secondary windings of these current transformers 26 at any point are illustrated as connected in Y and these Y-connected groups are connected in parallel, phase by phase, through conductors 27a, 27b, and 27c, respectively, and a common return conductor 28. In order to provide an equal burden for all the current transformers, the impedances of the respective circuits including the secondary windings of each of the current transformers 26 are preferably arranged to have the same value. Furthermore, since the lead lengths to the relays vary, a low secondary ampere rating is desirable in order to facilitate balancing the burdens.

The phase-fault differential relays 24a, 24b, and 24c are energized in parallel across one of the respective conductors 27a, 27b, and 27c and the return conductor 28 associated with the neutrals of the Y-connected current transformers 26. The ground-fault differential relay 25, on the other hand, is connected in series with the parallel arranged phase-fault relays. Each of the relays, when energized, closes or bridges a pair of contacts 29 so as to energize the tripping coils 15, 19, and 23 to trip the associated circuit breakers and isolate bus section 11.

The differential protective system so far described is similar to the differential protective systems of the prior art in which current transformers of the conventional closed magnetic-core type were used.

For reasons which are well known in the art, the direct-current component of the current on through faults, for example, in conjunction with the alternating-current component in such differential protective systems effected unequal saturation of the various current transformers so that, although a balance existed between the power currents into and out of the particular portion of the power circuit being protected, there was not a corresponding balance between the secondary currents of the current transformers. Consequently, a differential current of sufficient value flowed through the protective relay windings to effect an undesired operation of the relays so that a false tripping of the circuit breakers 22 was effected to isolate the bus section 11.

To overcome the difficulty due to this direct-current component of current, I employ, in accordance with my invention, magnetic-core current transformers 26 which are designed so that the cores are not saturated by the maximum currents that can flow through their respective primary windings and so that sufficient current also can be obtained from their secondary windings to operate the protective relays directly under all fault conditions requiring such operation. These results are obtained by providing the current transformer cores with one or more suitable air gaps.

In Figs. 2, 3, 4, and 5, there is disclosed in detail a current transformer having a magnetic core provided with one or more air gaps which may be used in the differential protective system disclosed in Fig. 1. This current transformer is illustrated as a bar-type transformer having a straight bar or conductor 32 for the primary winding around which is arranged the core 30 provided with one or more air gaps 31.

The core generally designated at 30 comprises a plurality of short laminated sections 33 and 34 arranged in a particular manner to form a rectangle or closed core member around bar conductor 32. The ends of these laminated sections are suitably spaced to form a plurality of air gaps 31. In order to hold these core sections in place, two sets of core clamps 35 and 36, respectively, are provided of nonmagnetic material. The core clamps 35 are provided to hold the laminated core sections 33 of the vertical legs in proper position. These clamps include extensions 35a at the lower ends thereof to form supporting or mounting legs for the current transformer. Core clamps 36 hold laminated core sections 34 in position to form the upper and lower legs of the current transformer core generally indicated at 30. The laminated sections 33 and 34 are fastened to the core clamps 35 and 36, respectively, by suitable rivets 37 which are preferably constructed of steel in order to withstand the mechanical forces involved under high-current conditions.

Since the plurality of air gaps 31 arranged around the rectangular core 30 are relatively large with respect to the cross section of the magnetic core, the fringing flux adjacent these air gaps is likely to be a large percentage of the total flux, thus tending to caues the outside of the core section to operate at much higher flux densities than the inner portions of the core. In order to substantially eliminate this tendency and to operate the magnetic core at a more or less uniform density, the outer laminations at the gap are arranged in step fashion, that is, the ends of the laminations are staggered with respect to each other so as to provide portions 38 of one cross section and portions 39 of a different cross section. In addition, the ends of the laminations are preferably rounded at the corners. As shown, the magnetic core sections 34 are produced by using short laminations 40 in combination with longer laminations 41 while the core sections 33 are formed by staggering still longer laminations 42 with respect to one another. The reason for providing a plurality of air gaps rather than one or two is to decrease the percentage of fringing flux at the gaps as well as to reduce the effect of interference from stray fields.

The air gaps 31 at the corners of the rectangular core structure may be made adjustable in order to adapt the current transformer for various applications. Accordingly, I provide adjusting screws 43, one at each corner of the transformer core by means of which the gap length may be varied. It will be understood, of course, that, when the current transformers are designed for a particular application, such adjustable feature will not be necessary. In any event, the lengths of the gaps 31 are designed to prevent saturation of the core by the combined effect of the total direct-current ampere turns of the primary winding and the alternating-current ampere turns of the exciting current. In addition, the current transformers are designed so that sufficient secondary current is obtained therefrom to operate conventional relays.

In view of the large mechanical stresses involved, it may be desirable to fill the so-called "air gaps" 31 with a nonmagnetic material, such as an insulating material of a type able to withstand fairly large mechanical stresses. In Fig. 3, I have shown an insulating material 44 inserted in one of the gaps 31 in order to increase the mechanical strength of the core to withstand the stresses involved under high-current conditions.

The secondary winding of the current transformer comprises four coils, two coils 45 being associated with the upper and lower legs of core 30 while coils 46 are associated with the two vertical legs of core 30, and these four coils are connected in series with one another. This particular disposition of the coils or secondary winding eliminates the effect of stray fields in so far as the current induced in these windings is concerned. As shown best in Figs. 2 and 4, the terminals of the secondary windings are supported on a suitable terminal block 47 mounted on the current transformer.

It has been found that, even with considerable spacing of the primary conductors, the leakage or stray flux from adjacent conductors is a considerable percentage of the flux in the core of the current transformer. As mentioned above, due to the disposition of the coils on the core, the effect of this stray flux on the secondary winding aside from saturation of the core is eliminated. However, this stray flux would tend to cause the core of the current transformer to saturate sooner than if this flux were not present and, to substantially eliminate this possibility, I provide a suitable shielding means 48 around the current transformer which preferably comprises a welded or soldered copper casing having windows 49 on either side thereof through which the bar conductor 32 may extend. Suitable insulation 50 will, of course, be provided around the primary winding comprising bar conductor 32.

When current transformers of the type disclosed in Figs. 2 to 5, inclusive, are used in the differential protective system shown in Fig. 1, there is substantially no possibility of effecting false operation of the protective relays due to the fact that the current transformers are designed to have a linear relationship between the primary and secondary currents thereof for all possible primary currents that might exist on the system. Furthermore, since the same linear relationship is maintained between the primary and secondary currents in all of the current transformers, no differential current can flow through the protective relays as long as there is no fault on bus section 11. When, however, a fault does occur on bus section 11, the current transformers are designed so that a differential current of sufficient magnitude is produced which flows through the protective relays to effect operation thereof.

Although I have thus far described my invention as applied to a differential protective system, false operations of relays associated with protective systems other than differential systems have resulted because of the saturation of the cores of the current transformers by the direct-current transient which is superimposed on the symmetrical alternating-current. Thus, in highly inductive circuits, ordinary switching operations might cause a direct-current transient of sufficient magnitude when superimposed upon the symmetrical alternating-current to cause false operation of an ordinary overcurrent relay, for example, even though no actual abnormal current existed requiring operation of the protective system. I have found that a current transformer provided with a magnetic core including one or more air gaps may be used in such protective systems not only to function as a true transformer but effectively to eliminate the direct-current component from causing false operation of the protective relays.

In Fig. 6, I have disclosed a relay 51 whose contacts 52 are connected in the tripping circuit of a circuit breaker, not shown, associated with a suitable protective system. The winding of relay 51 is connected to the secondary winding 53 of a magnetic-core current transformer 54 provided with one or more air gaps and having a primary winding 55 which may be connected to the conventional closed magnetic-core current transformer associated with the system to be protected, or, as in Fig. 1, current transformer 54 may be associated directly with a conductor of the system to be protected. As was described above, current transformer 54 will be designed so that the core thereof does not saturate even though a direct-current transient component is superimposed upon the symmetrical alternating current impressed on primary winding 55 and so that sufficient secondary current for operating relay 51 is obtained when a predetermined abnormal condition occurs on the protected system. I have found that if a closed magnetic-core current transformer were used, false operation of relay 51 might result, whereas when a magnetic-core current transformer provided with one or more air gaps is used, such false tripping is substantially eliminated and relay 51 is not subjected to the saturation and other disturbing effects produced by the long-time constant direct-current components as was common in the protective systems of the prior art.

Without intending to be bound by the theory advanced, the following discussion is offered to explain how the effect of the direct-current transient is eliminated when using a magnetic-core current transformer provided with one or more air gaps. Since the current transformer is designed so as not to saturate under any predetermined conditions, a linear relationship exists between the primary and secondary currents thereof. The time constant of the circuit associated with the secondary winding of the current transformer is equal to L/R where L is the inductance of this circuit and R the resistance thereof. It will, of course, be understood by those skilled in the art that the inductance of a current transformer having one or more air gaps in the magnetic core thereof is considerably lower than that of a current transformer having a closed magnetic core. Furthermore, since the inductance of the secondary winding of the current transformer is a large proportion of the inductance of the circuit associated with this winding, the time constant of this circuit is very much shorter when a current transformer having a magnetic core including an air gap is used than when a closed magnetic-core current transformer is used. Due to this short-time constant, the direct-current transient impressed on the primary winding of the current transformer even though transformed dies out within such a short interval of time as to have substantially no effect on the relay associated therewith, whereas, if this secondary circuit had a much longer time constant, such as would be the case when a closed magnetic-core current transformer were used, this direct-current component reflected in the secondary winding would adversely affect the relay 51 as set forth above and cause false tripping. In order to avoid false tripping in the arrangements of the prior art, it was necessary to use relays which would not operate until after this direct-current transient had disappeared and such delay obviously adversely affected the protection obtainable. However, in the present arrangement, the direct-current transient reflected in the secondary winding dies out within such a short interval of time that high-speed relays may satisfactorily be employed. Thus, with my arrangement, the effect of the direct-current component on high-speed relays is substantially eliminated without resorting to the use of complicated filter means or the like.

While I have shown and described certain particular embodiments of my invention, it will be apparent to those skilled in the art that my invention has other applications and that changes and modifications may be made without departing from the spirit and scope of my invention and I, therefore, aim in the appended claims to cover all such modifications and changes.

What I claim as new and desire to secure by Letters Patent of the United States is:

1. In combination, a current transformer comprising a closed magnetic core including a plurality of nonmagnetic sections therein so as to prevent saturation of said core and consequent ratio errors of said current transformer when energized with a direct-current component which is not transformed thereby, said nonmagnetic sections being formed of a material which will withstand the mechanical stresses on said core under abnormal electrical conditions on said tranformer, and a secondary winding on said core arranged to neutralize the inductive effect of stray fields thereon.

2. In combination, a current transformer comprising a rectangular core including a plurality of spaced laminated sections so as to provide a plurality of air gaps around said core to prevent saturation of said core and consequent ratio errors of said transformer, said laminated sections adjacent said air gaps being so constructed and arranged to reduce the fringing flux so that the magnetic sections of said core are operated at substantially uniform flux density, and a plurality of serially connected windings on said rectangular core positioned so as to neutralize the inductive effect of stray fields thereon.

3. In combination, a current transformer comprising a rectangular core including a plurality of spaced laminated sections so as to provide a plurality of air gaps around said core to prevent saturation of said core and consequent ratio errors of said transformer, said laminated sections adjacent said air gaps being arranged to reduce the fringing flux so that the magnetic sections of said core are operated at substantially uniform flux density, a plurality of serially connected windings on said rectangular core positioned so as to neutralize the inductive effect of stray fields thereon, and a shielding means for said transformer to prevent stray fields from saturating said core.

4. In combination, a current transformer comprising a rectangular core including a plurality of spaced laminated sections so as to provide a plurality of air gaps around said core to prevent saturation of said core and consequent ratio errors of said transformer, said laminated sections adjacent said air gaps being so constructed and arranged to reduce the fringing flux so that the magnetic sections of said core are operated at substantially uniform flux density, a plurality of serially connected windings on said rectangular core positioned so as to neutralize the inductive effect of stray fields thereon, and means for adjusting the width of said air gaps.

5. In a transformer comprising a closed magnetic core formed of a plurality of magnetic sections and a plurality of nonmagnetic sections between said magnetic sections so as to prevent saturation of said core and consequent ratio errors of said transformer when energized with a direct-current component which is not transformed thereby, said nonmagnetic sections being formed of a material which will withstand the mechanical stresses on said core under abnormal current conditions, and a secondary winding on said core arranged to neutralize substantially the inductive effect of stray fields thereon.

6. In a transformer comprising a closed magnetic core formed of a plurality of magnetic sections and a plurality of nonmagnetic sections between said magnetic sections so as to prevent saturation of said core and consequent ratio errors of said transformer when energized with a direct current component which is not transformed thereby, said nonmagnetic sections being formed of a material which will withstand the mechanical stresses on said core under abnormal current conditions, a secondary winding on said core arranged to neutralize substantially the inductive effect of stray fields thereon, and a conductive casing around said core and winding so as to substantially prevent stray fields from saturating said core.

ALLEN T. SINKS.